United States Patent
Telfer

(10) Patent No.: US 10,509,294 B2
(45) Date of Patent: Dec. 17, 2019

(54) DUAL SIDED ELECTROPHORETIC DISPLAY

(71) Applicant: E Ink Corporation, Billerica, MA (US)

(72) Inventor: Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/854,962

(22) Filed: Dec. 27, 2017

(65) Prior Publication Data

US 2018/0210310 A1  Jul. 26, 2018

Related U.S. Application Data

(60) Provisional application No. 62/450,304, filed on Jan. 25, 2017.

(51) Int. Cl.
| | |
|---|---|
| *G02B 26/00* | (2006.01) |
| *G02B 26/08* | (2006.01) |
| *G02F 1/29* | (2006.01) |
| *G02F 1/167* | (2019.01) |
| *G02F 1/1343* | (2006.01) |
| G02F 1/1333 | (2006.01) |
| G02F 1/1675 | (2019.01) |
| G02F 1/1676 | (2019.01) |
| G02F 1/1681 | (2019.01) |

(52) U.S. Cl.
CPC .......... *G02F 1/167* (2013.01); *G02F 1/13439* (2013.01); *G02F 1/1676* (2019.01); *G02F 1/1681* (2019.01); *G02F 2001/133342* (2013.01); *G02F 2001/1678* (2013.01)

(58) Field of Classification Search
CPC ............. G02F 1/167; G02F 2001/1676; G02F 1/1347; G02F 2001/094; G02F 2001/1678; G02F 2203/34; G02F 1/134363; G02F 2203/09
USPC ................ 359/237, 242, 265–267, 270–273, 359/290–292, 295, 296, 298
See application file for complete search history.

(56) References Cited

U.S. PATENT DOCUMENTS

| | | |
|---|---|---|
| 5,723,204 A | 3/1998 | Stefik |
| 5,760,761 A | 6/1998 | Sheridon |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Brandi N Thomas
(74) *Attorney, Agent, or Firm* — Ioannis Constantinides

(57) ABSTRACT

An image display medium includes a first and second layer of encapsulated dispersion fluid containing charged particles and a front and rear light-transmissive electrode. The first layer is positioned between the front light-transmissive electrode and the second layer and the second layer is position between the first layer and the rear light-transmissive electrode. The charged particles within the first layer have a color similar to and a charge opposite of the charged particles within the second layer. Alternatively, the charged particles within the first layer may have a color and a charge similar to the charged particles within the second layer and the display medium includes a common conductor positioned between the first and second layer that is configured to drive the charged particles in the first and second layer.

10 Claims, 6 Drawing Sheets

(56) References Cited

U.S. PATENT DOCUMENTS

| | | | |
|---|---|---|---|
| 5,777,782 A | 7/1998 | Sheridon | |
| 5,808,783 A * | 9/1998 | Crowley | G09F 9/372 |
| | | | 345/107 |
| 5,856,819 A | 1/1999 | Vossler | |
| 6,054,071 A | 4/2000 | Mikkelsen, Jr. | |
| 6,055,091 A | 4/2000 | Sheridon | |
| 6,067,185 A | 5/2000 | Albert | |
| 6,097,531 A | 8/2000 | Sheridon | |
| 6,128,124 A | 10/2000 | Silverman | |
| 6,137,467 A | 10/2000 | Sheridon | |
| 6,147,791 A | 11/2000 | Sheridon | |
| 6,241,921 B1 | 6/2001 | Jacobson | |
| 6,301,038 B1 | 10/2001 | Fitzmaurice | |
| 6,392,785 B1 | 5/2002 | Albert | |
| 6,753,999 B2 * | 6/2004 | Zehner | B41J 3/4076 |
| | | | 204/450 |
| 6,788,449 B2 | 9/2004 | Liang | |
| 6,825,829 B1 | 11/2004 | Albert | |
| 6,866,760 B2 | 3/2005 | Paolini, Jr. | |
| 6,870,657 B1 | 3/2005 | Fitzmaurice | |
| 6,922,276 B2 | 7/2005 | Zhang | |
| 6,950,220 B2 | 9/2005 | Abramson et al. | |
| 6,982,178 B2 | 1/2006 | LeCain et al. | |
| 7,002,728 B2 | 2/2006 | Pullen | |
| 7,012,600 B2 | 3/2006 | Zehner | |
| 7,072,095 B2 | 7/2006 | Liang | |
| 7,075,502 B1 | 7/2006 | Drzaic | |
| 7,109,968 B2 | 9/2006 | Albert et al. | |
| 7,112,114 B2 | 9/2006 | Liang | |
| 7,116,318 B2 | 10/2006 | Amundson | |
| 7,144,942 B2 | 12/2006 | Zang | |
| 7,158,282 B2 | 1/2007 | Liang | |
| 7,170,670 B2 | 1/2007 | Webber | |
| 7,215,313 B2 | 5/2007 | Giraldo | |
| 7,236,292 B2 | 6/2007 | LeCain | |
| 7,312,784 B2 | 12/2007 | Baucom | |
| 7,339,715 B2 | 3/2008 | Webber | |
| 7,342,068 B2 | 3/2008 | Klingenberg | |
| 7,391,555 B2 | 6/2008 | Albert et al. | |
| 7,411,719 B2 | 8/2008 | Paolini, Jr. | |
| 7,443,571 B2 | 10/2008 | LeCain et al. | |
| 7,453,445 B2 | 11/2008 | Amundson | |
| 7,513,813 B2 | 4/2009 | Paolini, Jr. et al. | |
| 7,535,624 B2 | 5/2009 | Amundson et al. | |
| 7,561,324 B2 | 7/2009 | Duthaler et al. | |
| 7,636,191 B2 | 12/2009 | Duthaler | |
| 7,649,666 B2 | 1/2010 | Isobe et al. | |
| 7,679,814 B2 | 3/2010 | Paolini, Jr. | |
| 7,715,088 B2 | 5/2010 | Liang | |
| 7,728,811 B2 | 6/2010 | Albert et al. | |
| 7,729,039 B2 | 6/2010 | LeCain et al. | |
| 7,791,782 B2 | 9/2010 | Paolini, Jr. | |
| 7,826,129 B2 | 11/2010 | Wu | |
| 7,839,564 B2 | 11/2010 | Whitesides et al. | |
| 7,843,621 B2 | 11/2010 | Danner et al. | |
| 7,843,624 B2 | 11/2010 | Danner | |
| 7,999,993 B2 | 8/2011 | Chui | |
| 8,009,348 B2 | 8/2011 | Zehner | |
| 8,034,209 B2 | 10/2011 | Danner | |
| 8,068,272 B2 | 11/2011 | LeCain et al. | |
| 8,077,381 B2 | 12/2011 | LeCain et al. | |
| 8,177,942 B2 | 5/2012 | Paolini, Jr. | |
| 8,390,301 B2 | 3/2013 | Danner | |
| 8,482,835 B2 | 7/2013 | LeCain | |
| 8,786,929 B2 | 7/2014 | LeCain | |
| 8,830,553 B2 | 9/2014 | Patry, Jr. | |
| 8,854,721 B2 | 10/2014 | Danner | |
| 9,075,280 B2 | 7/2015 | Whitesides | |
| 9,238,340 B2 | 1/2016 | Kayal | |
| 9,279,906 B2 | 3/2016 | Kang | |
| 9,341,916 B2 | 5/2016 | Telfer et al. | |
| 9,554,495 B2 | 1/2017 | Danner | |
| 9,733,540 B2 | 8/2017 | LeCain et al. | |
| 2007/0237962 A1 | 10/2007 | Liang | |
| 2009/0168067 A1 | 7/2009 | LeCain et al. | |
| 2011/0085226 A1 * | 4/2011 | Ogawa | G02F 1/167 |
| | | | 359/296 |
| 2011/0164301 A1 | 7/2011 | Paolini, Jr. | |
| 2015/0005720 A1 | 1/2015 | Zang | |
| 2015/0277160 A1 | 10/2015 | Laxton | |
| 2016/0012710 A1 | 1/2016 | Lu | |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater, vol. 14, No. 11, pp. 345-848 (Jun. 2002). Jun. 5, 2002.

* cited by examiner

DUAL SIDED ELECTROPHORETIC DISPLAY

CROSS REFERENCE TO RELATED APPLICATION

This application claims the benefit of and priority to U.S. Provisional Application having Ser. No. 62/450,304 having a filing date of Jan. 25, 2017, the content of which is incorporated by reference herein in its entirety.

FIELD OF THE INVENTION

This invention relates to electrophoretic media. More specifically, in one aspect this invention relates to electrophoretic media and dual sided electro-optic displays in which the electrophoretic media may be incorporated.

BACKGROUND OF INVENTION

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034, 209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Application Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electro-optic display normally comprises a layer of electro-optic material and at least two other layers disposed on opposed sides of the electro-optic material, one of these two layers being an electrode layer. There are several situations, especially in the field of electrophoretic devices designed for architectural applications, in which it would be desirable that both sides of a planar display be able to be switched simultaneously to the same optical state so that the image on either side of the display is near identical. In conventional, opaque electrophoretic compositions, for example those that incorporate oppositely-charged pigments and switch between a dark and a light state, the rear surface of the display displays a color that is complementary to the color of the front surface, but not similar. Thus, there is a need for dual sided electrophoretic displays that are capable of displaying similar images on opposing surfaces.

SUMMARY OF THE INVENTION

In one aspect of the present invention, an image display medium comprises a first and second layer of encapsulated dispersion fluid, the dispersion fluid containing charged particles and a front and rear light-transmissive electrode. The first layer may be positioned between the front light-transmissive electrode and the second layer and the second layer may be positioned between the first layer and the rear light-transmissive electrode. The charged particles within the first layer may have a color similar to and a charge opposite of the charged particles within the second layer.

In another aspect of the present invention, an image display medium comprises a first and second layer containing a plurality of encapsulated multi-chromal charged particles surrounded by a fluid and a front and rear light-transmissive electrode. The first and second layer may be positioned between the front and rear light-transmissive electrodes. The multi-chromal charged particles within the first layer have a surface portion with a charge opposite of a similarly colored surface portion of the multi-chromal charged particles within the second layer.

In yet another aspect of the present invention, an image display medium comprises a first and second layer of encapsulated dispersion fluid containing charged particles, a common conductor positioned between the first and second layer and configured to drive the charged particles in the first and second layer, and a front and rear light-transmissive electrode. The first and second layer may be positioned between the front and rear light-transmissive electrode, and the charged particles within the first layer may have a color and a charge similar to the charged particles within the second layer.

In yet another aspect of the present invention, an image display medium comprises a first and second layer containing a plurality of encapsulated multi-chromal charged particles surrounded by a fluid, a common conductor positioned between the first and second layer and configured to drive the charged particles in the first and second layer, and a front and rear light-transmissive electrode. The first and second layer may be positioned between the front and rear light-transmissive electrode, and the multi-chromal charged particles within the first layer may have a surface portion with a color and charge similar to a surface portion of the multi-chromal charged particles within the second layer.

These and other aspects of the present invention will be apparent in view of the following description.

BRIEF DESCRIPTION OF THE FIGURES

The drawing Figures depict one or more implementations in accord with the present concepts, by way of example only, not by way of limitations. In the figures, like reference numerals refer to the same or similar elements.

DETAILED DESCRIPTION

Figure 1A:
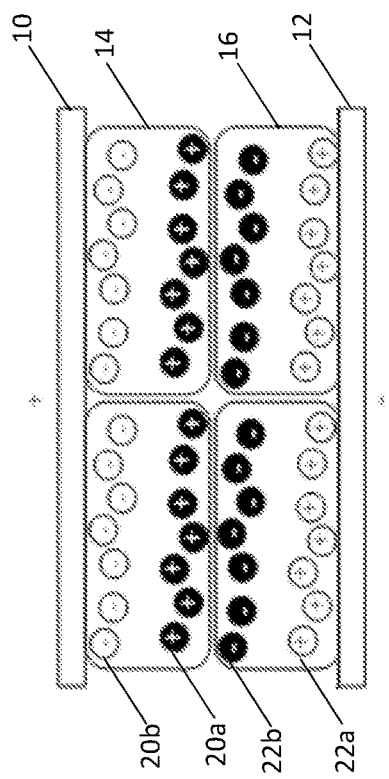
FIG. 1A is a schematic side view of an electrophoretic display according to a first embodiment of the present invention.

In the following detailed description, numerous specific details are set forth by way of examples in order to provide a thorough understanding of the relevant teachings. However, it should be apparent to those skilled in the art that the present teachings may be practiced without such details.

Generally, the various embodiments of the present invention provide a dual sided electrophoretic display capable of displaying a similar, preferably identical, optical state on the opposing surfaces of the display.

In a first embodiment of the present invention, an image display medium is provided that comprises a first and second layer of encapsulated dispersion fluid containing charged particles and a front and rear light-transmissive electrode. The first layer may be positioned between the front light-transmissive electrode and the second layer and the second layer may be positioned between the first layer and the rear light-transmissive electrode. The charged particles within the first layer may have a color similar to and a charge opposite of the charged particles within the second layer.

The charged particles within each of the first and second layers may comprise two or more colored particles. To avoid ambiguity, as used herein, "colored" particles include particles perceived as being "black" or "white." Various methods known to those of skill in the art may be used to encapsulate the dispersion fluid containing the colored particles. For example, the dispersion fluid may be encapsulated within a microcapsule, a microcell, or within a polymeric matrix.

In another embodiment, an image display medium according to the present invention may comprise two layers, each containing a plurality of encapsulated multi-chromal charged particles, wherein the multi-chromal charged particles within the first layer have a surface portion with a charge opposite of a similarly colored surface portion of the multi-chromal charged particles within the second layer. The multi-chromal charged particles may be spherical or cylindrical bichromal particles.

In yet another embodiment of the present invention, an image display medium is provided that may comprise first and second layers of encapsulated dispersion fluid containing charged particles, a common conductor positioned between the first and second layer and configured to drive the charged particles in the first and second layer, and a front and rear light-transmissive electrode, the first and second layer positioned between the front and rear light-transmissive electrode. Unlike the first embodiment described above, the charged particles within the first layer have a color and a charge similar to the charged particles within the second layer. In order to provide a dual display in which the images on the opposing viewing surfaces are similar, the front and rear light-transmissive electrodes may be configured to maintain similar potentials relative to the common conductor. Like the first embodiment, the charged particles within each of the first and second layers may comprise two or more colored particles, and the dispersion fluid may be encapsulated within a microcapsule, a microcell, or a polymeric matrix. In alternative embodiment, the encapsulated fluid containing a plurality of particles in the first and second layer may be replaced with a plurality of encapsulated multi-chromal charged particles, such as bi-chromal spherical or cylindrical particles, surrounded by a fluid. The multi-chromal charged particles within the first layer may have a surface portion with a color and charge similar to a surface portion of the multi-chromal charged particles within the second layer.

Figure 1B:
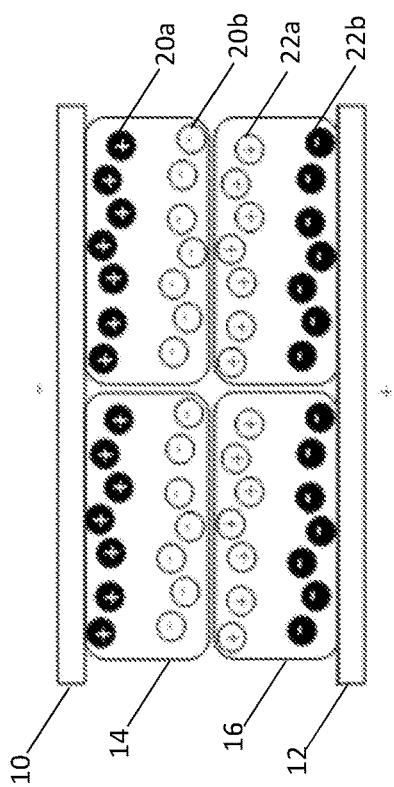
FIG. 1B is a schematic side view of the electrophoretic display of FIG. 1A having a different optical state.

Referring now specifically to the Figures, FIGS. 1A and 1B provide a schematic side view of a dual-sided electrophoretic display according to one embodiment of the present invention. The display may include a front light-transmissive electrode 10 and a rear light-transmissive electrode 12, as well as a first layer 14 and a second layer 16 of encapsulated dispersion fluid. The first layer 14 and the second layer 16 may be adjacent to each other, such that the first layer 14 may be located between the front light-transmissive electrode 10 and the second layer 16, while the second layer 16 is located between the first layer 14 and the rear light-transmissive electrode 12.

The encapsulated dispersion fluid within each layer may contain a plurality of similarly charged, colored particles. However, the first layer 14 may comprise encapsulated fluid containing a plurality of particles having a similar color, but opposite charge polarity as a plurality of particles within the second layer 16. For example, in the schematics of FIGS. 1A and 1B, the particles 20a in the first layer 14 have a dark color and positive charge, while particles 22b in the second layer 16 have a similar dark color, but opposite negative charge. Similarly, the particles 20b in the first layer have a light color and negative charge, while the particles 22a in the second layer 16 having a similar light color, but opposite positive charge.

Upon applying a voltage to the front electrode 10 and rear electrode 12, such that the front electrode 10 is maintained at a more negative potential than the rear electrode 12, as illustrated in FIG. 1A, the dark colored particles 20a and 22b are attracted to the front electrode 10 and rear electrode 12, respectively. Thus, the optical state viewed from either the front electrode 10 or rear electrode 12 will appear substantially similar. When the voltage applied to the front electrode 10 and the rear electrode 12 is reversed, such that the rear electrode 12 is maintained at a more negative potential, as illustrated in FIG. 1B, the light colored particles 20b and 22a are attracted to the front electrode 10 and rear electrode 12, respectively.

As would be appreciated by one of skill in the art, it is not necessary for the similarly colored particles in the first and second layer of encapsulated dispersion fluid to have similar charge intensity or mobility. However, for applications in which it is desired that the optical states on either viewing surface of the display switch relatively simultaneously, it is preferred that most of the properties of the particles and dispersion fluid of the two layers generally match, e.g. dispersion fluid density, particle specific gravity, particle charge intensity, etc.

Figure 2B:
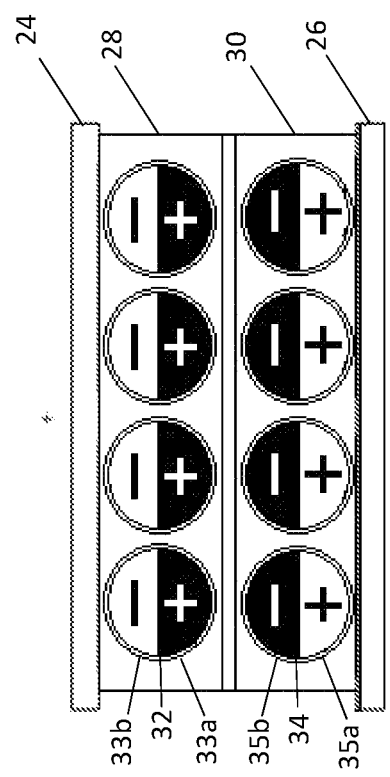
FIG. 2B is a schematic side view of the electrophoretic display of FIG. 2A having a different optical state.
Figure 2A:
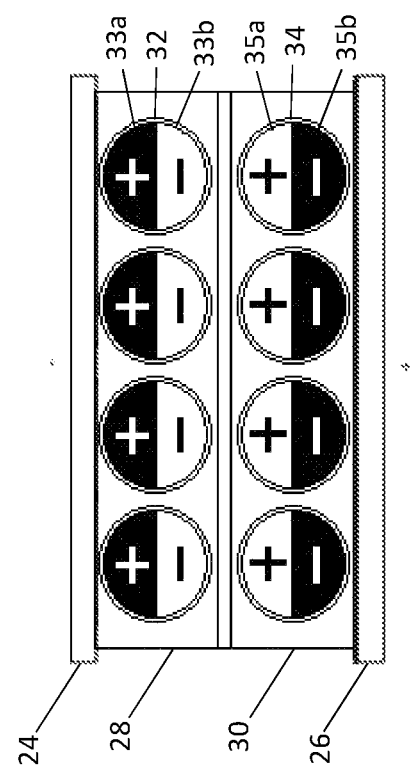
FIG. 2A is a schematic side view of an electrophoretic display according to a second embodiment of the present invention.

Referring now to FIGS. 2A and 2B, a second embodiment of the present invention is similar to the first embodiment, except that the plurality of encapsulated dispersion fluid containing charged particles has been replaced with a first layer 28 and a second layer 30 of multi-chromal particles, specifically spherical, bi-chromal particles. The first layer 28 and second layer 30 are located between a light-transmissive front electrode 24 and light-transmissive rear electrode 26. Each of the bi-chromal particles is located within an encapsulated fluid, such that the bi-chromal particles are free to rotate, and each of the bi-chromal particles having differently colored and charged hemispheres. For example, as illustrated in FIGS. 2A and 2B, the bi-chromal particles 32 in the first layer 28 have a dark colored hemisphere 33a that is positively charged and a light colored hemisphere 33b that is negatively charged. The bi-chromal particles 34 in the second layer 30 are reversed in that the light colored hemisphere 35a is positively charged, while the dark colored hemisphere 35b is negatively charged.

Upon applying a voltage to the front electrode 24 and rear electrode 26, such that the front electrode 24 is maintained at a more negative potential than the rear electrode 26, as illustrated in FIG. 2A, the dark colored hemispheres 33a and 35b of the bi-chromal particles 32 and 34 are attracted to the front electrode 24 and rear electrode 26, respectively. Thus, the optical state viewed from either the front electrode 24 or rear electrode 26 will appear substantially similar. When the voltage applied to the front electrode 24 and the rear electrode 26 is reversed, such that the rear electrode 26 is maintained at a more negative potential, as illustrated in FIG. 2B, the bi-chromal particles 32 and 34 rotate because the light colored hemispheres 33b and 35a are attracted to the front electrode 24 and rear electrode 26, respectively.

Figure 3:
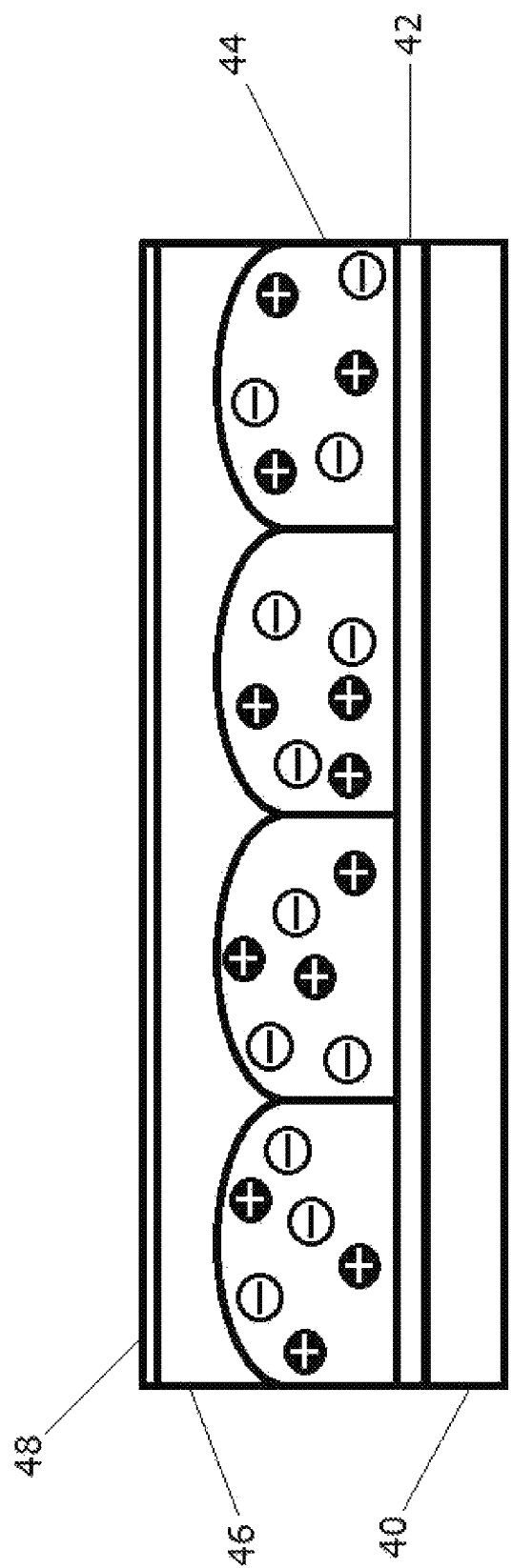
FIG. 3 is an idealized side view of a single layer of microcapsules applied to a substrate according to a third embodiment of the present invention.

Various methods known to those of skill in the art may be employed to manufacture the layers and coatings together to form the dual-sided displays according to the present invention, such as U.S. Pat. Nos. 6,067,185; 6,392,785; 7,109, 968, and 7,391,555, the contents of each are incorporated herein by reference in their entireties. For example, referring to FIG. 3, a substrate 40 may be used as a base surface on which a layer of conductive material 42 may be applied to form a light-transmissive electrically conductive layer. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate 40 will typically be a polymeric film, and will normally have a thickness in the range of about 1 to about 25 mil (25 to 634 µm), preferably about 2 to about 10 mil (51 to 254 µm). The conductive material 42 is conveniently a thin metal or metal oxide layer of, for example, aluminum or ITO, or may be a conductive polymer.

A layer of microcapsules 44 may be prepared by first forming an emulsion in which the discontinuous phase comprises droplets of an electrophoretic internal phase that comprises at least two pigments and a fluid (which is typically a low polarity, substantially water-immiscible hydrocarbon), normally with the addition of a charge control agent. The continuous phase of the emulsion comprises an aqueous solution of a polymer, typically gelatin. Polymeric material is deposited onto the surface of the droplets by, for example, formation of a coacervate of the gelatin and a second polymer, typically acacia, to form a thin capsule wall that may optionally be cross-linked, for example with an aldehyde. The resultant deformable microcapsules are spheres of approximately 20-100 µm in diameter that are separated and mixed with a binder, such as a curable polymeric material. When the microcapsules 44 are coated on a flat surface, such as the conductive material 42, at a controlled coverage, they form essentially a monolayer 44 of capsules. A lamination adhesive 46 may then be applied to the monolayer 44 of capsules before applying a release sheet 48. The process described above may be repeated to form the second half of the laminate, except that a new emulsion may be prepared in which the charge polarity of the two pigments in the microcapsules is reversed. The two halves of the laminate may then be laminated together by removing the release sheets and applying heat and/or pressure. Mass production of the laminate may be achieved using printing and/or roll lamination techniques, for example.

Figure 4:
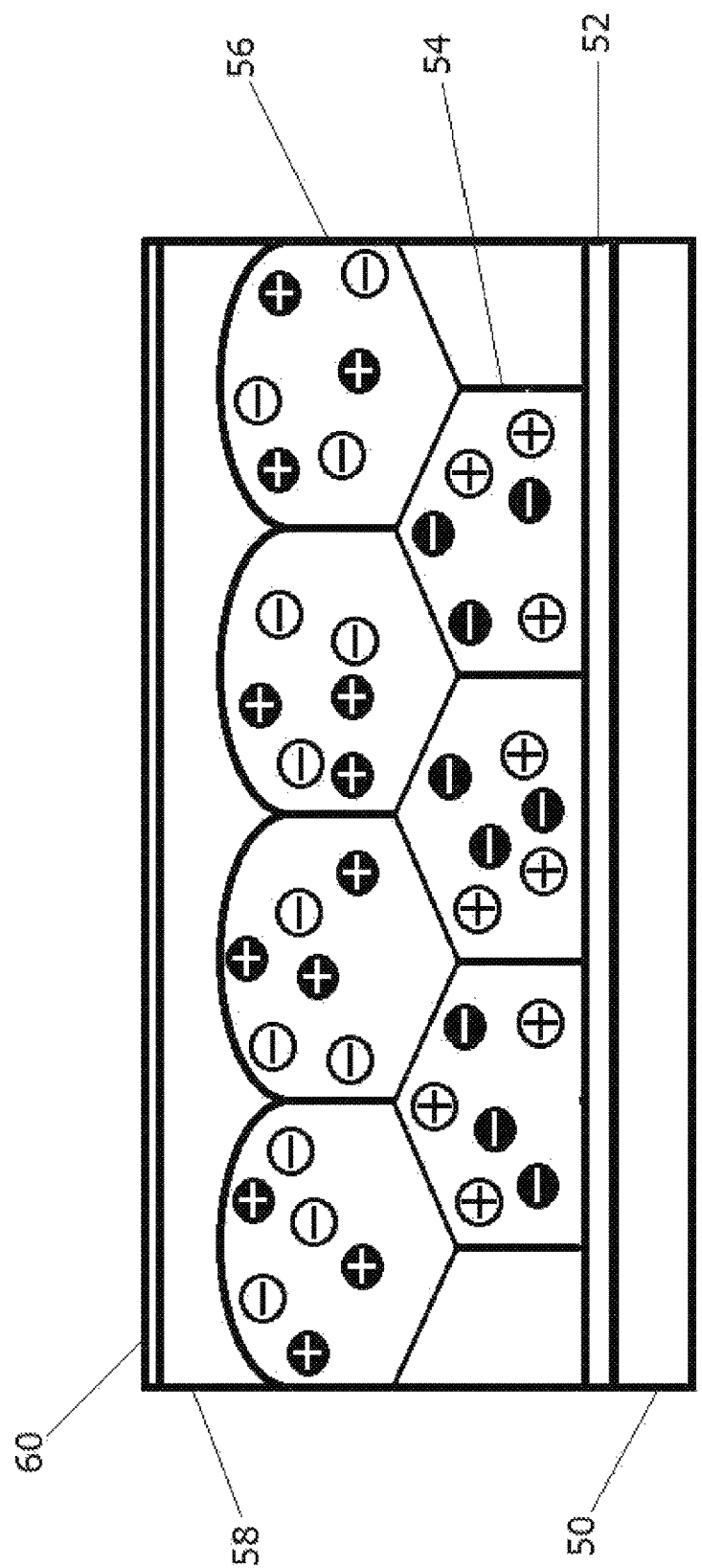
FIG. 4 is an idealized side view of a double layer of microcapsules applied to a substrate according to a fourth embodiment of the present invention.

Another embodiment of a method of making a dual sided display may include applying two layers of the electro-optic material prior to applying the lamination adhesive and the release sheet. Methods of applying multiple layers of electrophoretic media are known and described, for example, in U.S. Pat. No. 9,341,916, the contents of which are incorporated herein by reference in its entirety. Referring now to FIG. 4, a light-transmissive conductive layer may be provided by applying a conductive material 52 to a substrate 50 and then coating a layer of microcapsules 54 to the conductive material 52, similar to the first method described above. However, once the first layer 54 has dried, a second layer of microcapsules 56 may then be applied on top of the first layer 54. The microcapsules of the second layer 56 may contain pigments having a similar color, but opposite charge polarity as the pigments within the microcapsules of the first layer 54. The lamination adhesive 58 and release sheet 60 may then be applied to the second layer 56. The final steps would therefore include removal of the release sheet and lamination to another light-transmissive conductive layer similar to substrate 50 and conductive material 52.

In yet another embodiment of the present invention, the dual sided display may be manufactured by first providing multiple layers of electroptic material having a "double release sheet," such as those described in U.S. Pat. No. 7,561,324, the contents of which are incorporated herein by reference in its entirety. One or two layers of electro-optic material may be sandwiched between two adhesive layers and/or release sheets. The double release sheet may then be used in two separate or simultaneous laminations in which the release sheets are removed and the two layers of electro-optic material are laminated together, if necessary, and each of the outer surfaces are respectively laminated to a light-transmissive conductive layer.

Figure 5:
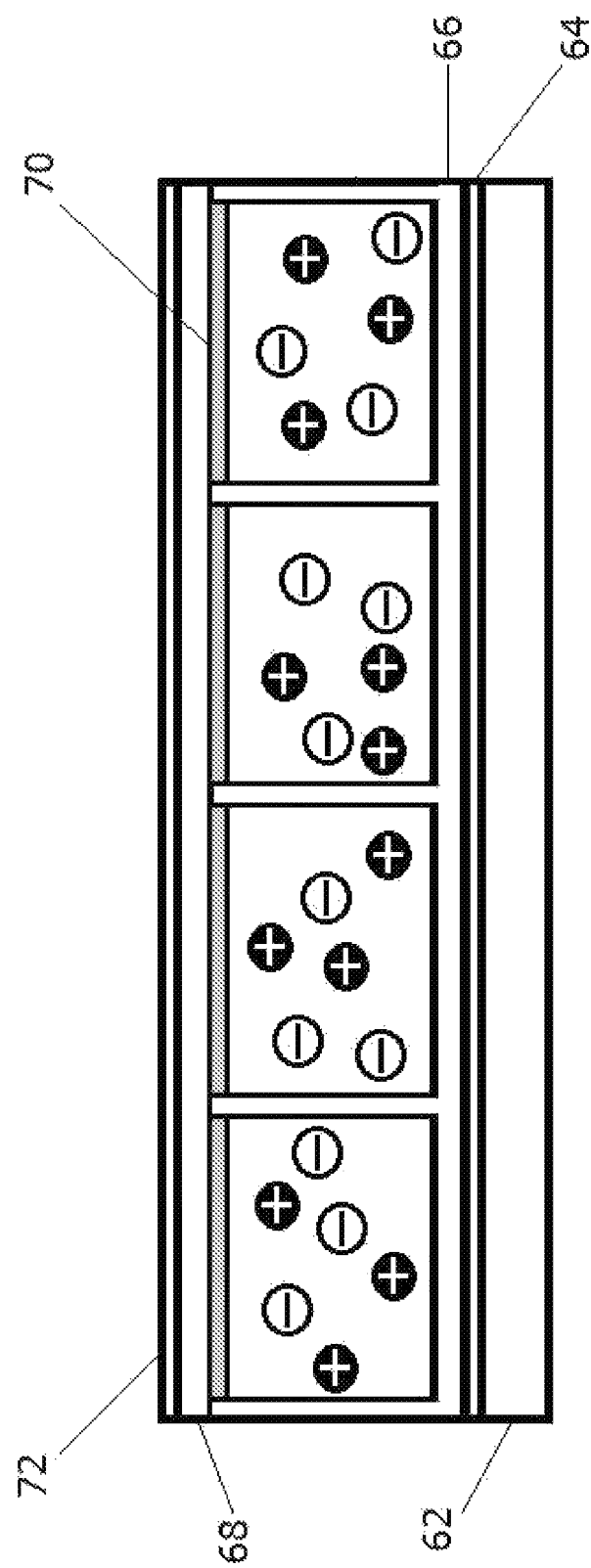
FIG. 5 is an idealized side view of a single layer of microcells according to a fifth embodiment of the present invention.

According to yet another embodiment of the present invention, the layers of electro-optic within the dual-sided display may comprise a plurality of microcells instead of microcapsules. Methods of forming microcells are known, such as those described in U.S. Pat. No. 6,788,449, the contents of which are incorporated herein by reference in its entirety. Referring to FIG. 5, a light-transmissive conductive layer may be provided by coating a conductive material 64, such as indium tin oxide, onto a light-transmissive substrate 62, such as PET. An optional thin layer of primer may be applied to the conductive material 64, generally less than 1 micron thick. A layer 66 of a liquid mixture of polymerizable monomers comprising a photo-initiator may then be applied over the light-transmissive conductive layer 64 and optional primer layer if present. The liquid monomer may then be embossed with a microcell pattern using an embossing tool, such as an embossing drum, while simultaneously irradiating the liquid monomer with UV light, for example, through the light-transmissive substrate 62. Upon releasing the partially cured liquid mixture layer 66 from the embossing tool, the layer 66 may be completely cured by irradiating the exposed embossed side of the layer 66 with additional UV light. Once formed, the microcells are filled with suspensions comprising a dielectric solvent with charged pigment particles dispersed therein and sealed by applying a sealing layer 70 comprising an aqueous composition over the suspensions that is subsequently dried. Once sealed, a lamination adhesive 68 may be applied to the layer of microcells 66 followed by a release sheet 72.

The process for forming the microcells described above may be repeated to form the second half of the laminate, except that a new suspension may be prepared in which the charge polarity of the two pigments in the suspension is reversed. The two halves of the laminate may then be laminated together by removing the release sheets and applying heat and/or pressure.

In the processes described above, the lamination may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of an electro-optic display in this manner imposes stringent requirements upon the lamination adhesive used, especially in the case of a display using an encapsulated electrophoretic medium. The lamination adhesive should have sufficient adhesive strength to bind the electro-optic layer to the layer (typically an electrode layer) to which it is to be laminated, and in the case of an encapsulated electrophoretic medium, the adhesive should also have sufficient adhesive strength to mechanically hold the capsules together. If the electro-optic display is to be of a flexible type (and one of the important advantages of rotating bichromal member and encapsulated electrophoretic displays is that they can be made flexible), the adhesive should have sufficient flexibility not to introduce defects into the display when the display is flexed. The lamination adhesive should have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination temperature should indeed be kept as low as possible, and room temperature lamination would be ideal, but no commercial adhesive has been found which permits such room temperature lamination. The lamination adhesive should be chemically compatible with all the other materials in the display.

U.S. Patent Application Publication No. 2005/0107564 describes an aqueous polyurethane dispersion comprising a polyurethane polymer comprising the reaction product of: (a) an isocyanate terminated prepolymer comprising the reaction product of (i) at least one polyisocyanate comprising a,a,a,a-tetramethylxylene diisocyanate [systematic name 1.3-bis(1-isocyanato-1-methylethyl)benzene; this material may hereinafter be called "TMXDI"]; (ii) at least one difunctional polyol comprising polypropylene glycol, and (iii) an isocyanate reactive compound comprising an acid functional group and at least two isocyanate reactive groups selected from a hydroxy, a primary amino, a secondary amino, and combinations thereof; (b) a neutralizing agent comprising a tertiary amino group; (c) a monofunctional chain terminating agent; (d) a chain extending agent comprising an organic diamine; and (e) water. This polyurethane dispersion, which may hereinafter be called the "TMXDI/PPO" dispersion, has been found to be useful as a lamination adhesive in electro-optic displays.

In yet another embodiment of the present invention, the provision of two different suspensions containing oppositely charged particles may be avoided by introducing an additional conductor between the layers of electro-optic material. For example, referring to FIGS. 6A and 6B, a first layer 74a and second layer 74b may have a generally identical composition, i.e. the suspensions contain similarly colored, charged particles. The first and second layers 74a, 74b are located between front and rear light-transmissive electrodes 76, 78, and a common central conductor 80 is located between the first and second layers 74a, 74b. It is not necessary for the central common conductor to be light-transmissive. In certain applications, it may be preferred that the central common conductor is reflective.

Figure 6A:
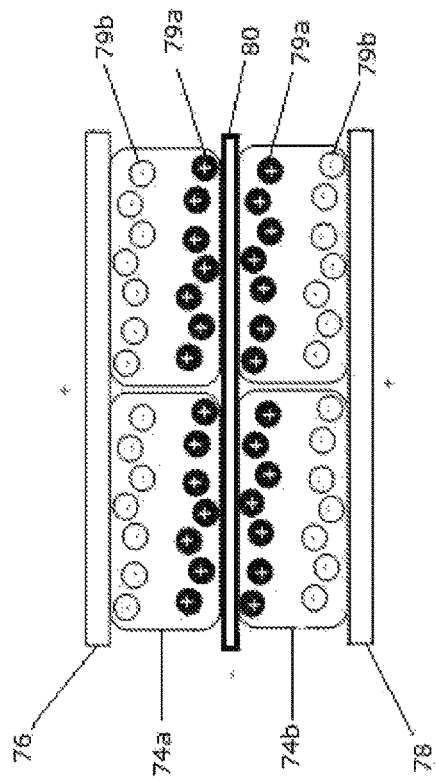
FIG. 6A is a schematic side view of an electrophoretic display according to a sixth embodiment of the present invention.

Upon applying a voltage to the front electrode 76, rear electrode 78, and common conductor 80, such that the front and rear electrodes 76, 78 are maintained at a more negative potential than the common electrode 80, as illustrated in FIG. 6A, the dark colored particles 79a of the first layer 74a and second layer 74b are attracted to the front electrode 76 and rear electrode 78, respectively. Thus, the optical state viewed from either the front electrode 76 or rear electrode 78 will appear substantially similar. When the voltage applied to the outer electrodes 76, 78 and the common conductor 80 is reversed, such that the common conductor 80 is maintained at a more negative potential, as illustrated in FIG. 6B, the light colored particles 79b of the first layer 74a and second layer 74b are attracted to the front electrode 76 and rear electrode 78, respectively.

Figure 6B:
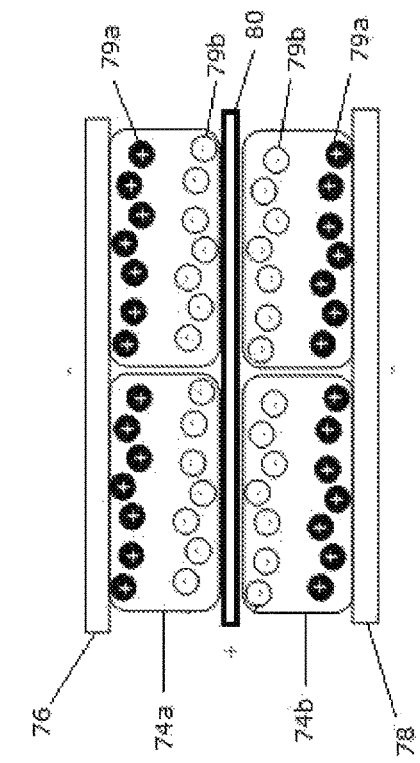
FIG. 6B is a schematic side view of the electrophoretic display of FIG. 6A having a different optical state.

The embodiment, such as the display illustrated in FIGS. 6A and 6B, may be manufactured using similar processes and lamination steps as described above. The processes would be simplified in that only one composition of a dispersion containing charged, colored particles would be required, but an additional lamination step may be necessary in order to laminate two halves of the display containing a release sheet to a central common conductor. Alternatively, the central common conductor may be made from a material, such as indium tin oxide or a conductive polymer, that is applied to one half of the laminate prior to or instead of a release sheet.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

I claim:
1. A display comprising:
  a first and second layer comprising encapsulated fluid containing a first set of positively charged particles and a second set of negatively charged particles;
  a common conductor positioned between the first and second layer; and a front and rear light-transmissive electrode, the first and second layer positioned between the front and rear light-transmissive electrode, wherein the first set of charged particles within the first layer have a color similar to the first set of charged particles within the second layer, the second set of charged particles within the first layer have a color similar to the second set of charged particles within the second layer, and wherein the front electrode, rear electrode, and common conductor are configured such that the front and rear electrodes are capable of being maintained at a more negative potential than the common conductor to drive the first set of particles in the first and second layer away from the common conductor and the front and rear electrodes are capable of being maintained at a more positive potential than the common conductor to drive the second set of particles in the first and second layer away from the common conductor.

2. The display of claim 1, wherein the front and rear light-transmissive electrodes are configured to maintain similar potentials relative to the common conductor.

3. The display of claim 1, wherein the fluid is encapsulated within a microcapsule.

4. The display of claim 1, wherein the fluid is encapsulated within a microcell.

5. The display of claim 1, wherein the fluid is encapsulated within a polymeric matrix.

6. A display comprising:

a first and second layer containing a plurality of encapsulated multi-chromal charged particles surrounded by a fluid, the multi-chromal charged particles having a first positively charged surface portion and a second negatively charged surface portion;

a common conductor positioned between the first and second layer; and a front and rear light-transmissive electrode, the first and second layer positioned between the front and rear light-transmissive electrode, wherein the first positively charged surface portion of the multi-chromal charged particles within the first layer have a color similar to the first positively charged surface portion of the multi-chromal charged particles within the second layer, and wherein the front electrode, rear electrode, and common conductor are configured such that the front and rear electrodes are capable of being maintained at a more negative potential than the common conductor to repel the first positively charged surface portion of the multi-chromal charged particles in the first and second layer away from the common conductor, and the front and rear electrodes are capable of being maintained at a more positive potential than the common conductor to attract the first positively charged surface portion of the multi-chromal charged particles in the first and second layer towards the common conductor.

7. The display of claim 6, wherein the front and rear light-transmissive electrodes are configured to maintain similar potentials relative to the common conductor.

8. The display of claim 6, wherein the multi-chromal charged particles are bichromal.

9. The display of claim 6, wherein the multi-chromal charged particles are spherical.

10. The display of claim 6, wherein the multi-chromal charged particles are cylindrical.

* * * * *